(12) United States Patent
Jeon et al.

(10) Patent No.: US 10,382,104 B2
(45) Date of Patent: Aug. 13, 2019

(54) WIRELESS COMMUNICATION DEVICES FOR ADAPTIVE BEAMFORMING AND METHODS OF OPERATING THE SAME

(71) Applicant: Samsung Electronics Co., Ltd., Suwon-si, Gyeonggi-do (KR)

(72) Inventors: Eun-sung Jeon, Seoul (KR); Joon-suk Kim, Seoul (KR); Sung-soo Kim, Seoul (KR); Jung-woon Lee, Daejeon (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/006,979

(22) Filed: Jun. 13, 2018

(65) Prior Publication Data

US 2019/0097694 A1 Mar. 28, 2019

(30) Foreign Application Priority Data

Sep. 25, 2017 (KR) .................. 10-2017-0123653

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0456* (2013.01); *H04B 7/0626* (2013.01);
(Continued)

(58) Field of Classification Search
CPC .. H04B 7/0417; H04B 7/0676; H04B 7/0632; H04L 5/0057
(Continued)

(56) References Cited

U.S. PATENT DOCUMENTS

| 7,680,205 | B2 | 3/2010 | Ariyavisitakul |
| 7,961,775 | B2 | 6/2011 | Kent et al. |

(Continued)

FOREIGN PATENT DOCUMENTS

| KR | 10-1021700 B1 | 3/2011 |
| KR | 10-1375916 B1 | 3/2014 |
| WO | WO 2006/052890 A1 | 5/2006 |

OTHER PUBLICATIONS

Ariyavisitakul et al., "Subspace Beamforming for Near-Capacity MIMO Performance, " IEEE Transactions for Signal Processing, vol. 56, No. 11, Nov. 2008, pp. 5729-5733.
(Continued)

*Primary Examiner* — Helene E Tayong
(74) *Attorney, Agent, or Firm* — Muir Patent Law, PLLC

(57) ABSTRACT

Methods of operating a wireless communication device for adaptive beamforming of a base station according to a state of a channel are provided. The methods include receiving a sounding packet from the base station through the channel; obtaining channel quality about the channel, using the sounding packet; selecting a feedback mode out of a plurality of feedback modes based on the channel quality; generating a matrix to be a basis of the adaptive beamforming, based on the selected feedback mode; and transmitting channel state information including information on the matrix to the base station.

18 Claims, 13 Drawing Sheets

(51) Int. Cl.
*H04B 7/06* (2006.01)
*H04L 5/00* (2006.01)
*H04B 7/0456* (2017.01)

(52) U.S. Cl.
CPC ......... *H04B 7/0632* (2013.01); *H04B 7/0645* (2013.01); *H04L 5/0057* (2013.01)

(58) Field of Classification Search
USPC .......................................................... 375/267
See application file for complete search history.

(56) References Cited

U.S. PATENT DOCUMENTS

| | | | |
|---|---|---|---|
| 8,217,834 B2 | 7/2012 | Wen et al. | |
| 8,218,609 B2* | 7/2012 | Walton | H04B 7/0417 375/219 |
| 8,229,017 B1* | 7/2012 | Lee | H04B 7/0665 342/432 |
| 8,472,381 B1* | 6/2013 | Lee | H04B 7/0617 370/328 |
| 8,655,625 B2 | 2/2014 | Souloumiac | |
| 8,737,494 B2 | 5/2014 | Kim et al. | |
| 8,787,469 B2 | 7/2014 | Kim et al. | |
| 8,848,818 B2 | 9/2014 | Kim et al. | |
| 9,077,413 B2 | 7/2015 | Hawryluck et al. | |
| 9,225,478 B2 | 12/2015 | Chen et al. | |
| 9,737,494 B2 | 8/2017 | Oishi et al. | |
| 2007/0098106 A1* | 5/2007 | Khojastepour | H04L 1/06 375/267 |
| 2010/0056059 A1* | 3/2010 | Lakshmanan | H04B 7/0452 455/63.1 |
| 2010/0182198 A1* | 7/2010 | Wen | H01Q 3/2605 342/373 |

OTHER PUBLICATIONS

Jiang, Yi, "Joint Transceiver Design for MIMO Communications Using Geometric Mean Decomposition," IEEE Transactions on Signal Processing, vol. 53, No. 10, Oct. 2005, pp. 3791-3803.

\* cited by examiner

| SNR | FB_MODE | DATA RATE |
|---|---|---|
| S1 | SVD | R1_A |
| S1 | GMD | R1_B |
| S2 | SVD | R2_A |
| S2 | GMD | R2_B |
| ⋮ | ⋮ | ⋮ |
| SK | SVD | RK_A |
| SK | GMD | RK_B |

FIG. 4B

FROM S110

READ VALUE OF DATA RATE OF WIRELESS COMMUNICATION DEVICE CORRESPONDING TO SNR VALUE FROM FIRST MODELING INFORMATION BY REFERRING TO FIRST MODELING INFORMATION — S122A

COMPARE DATA RATE VALUE CORRESPONDING TO SVD MODE WITH DATA RATE VALUE CORRESPONDING TO GMD MODE — S124A

SELECT FEEDBACK MODE BASED ON COMPARISON RESULT — S126A

| ψ(REF_DEGREE) | cos(ψ) | sin(ψ) | REF_RATIO |
|---|---|---|---|
| 45 | 0.7071 | 0.7071 | 1 |
| 50 | 0.6428 | 0.766 | 1.420276625 |
| 55 | 0.5736 | 0.8192 | 2.039606729 |
| 60 | 0.5 | 0.866 | 3 |
| 65 | 0.4226 | 0.9063 | 4.598909932 |
| 70 | 0.342 | 0.9397 | 7.54863217 |
| 75 | 0.2588 | 0.9659 | 13.92820323 |
| 80 | 0.1736 | 0.9848 | 32.16343748 |
| 85 | 0.0872 | 0.9962 | 130.6460956 |
| 90 | 0 | 1 | ∞ |

LUT_1

FIG. 7B

| Ψ(REF_DEGREE) | cos(ψ) | sin(ψ) | REF_RATIO |
|---|---|---|---|
| 45 | 0.7071 | 0.7071 | 1 |
| 55 | 0.5736 | 0.8192 | 2.039606729 |
| 65 | 0.4226 | 0.9063 | 4.598909932 |
| 75 | 0.2588 | 0.9659 | 13.92820323 |
| 85 | 0.0872 | 0.9962 | 130.6460956 |

LUT_2

| SNR | SVD_MODE | |
|---|---|---|
| | MCS | DATA RATE |
| S1 | MCS_1 | R1_1A |
| | MCS_2 | R1_2A |
| | ... | ... |
| | MCS_M | R1_MA |
| S2 | MCS_1 | R2_2A |
| | MCS_2 | R2_2A |
| | ... | ... |
| | MCS_M | R2_MA |
| ... | ... | ... |
| SK | MCS_1 | RK_1A |
| | MCS_2 | RK_2A |
| | ... | ... |
| | MCS_M | RK_MA |

ML_2B

| SNR | GMD_MODE | |
|---|---|---|
| | MCS | DATA RATE |
| S1 | MCS_1 | R1_1B |
| | MCS_2 | R1_2B |
| | ... | ... |
| | MCS_M | R1_MB |
| S2 | MCS_1 | R2_2B |
| | MCS_2 | R2_2B |
| | ... | ... |
| | MCS_M | R2_MB |
| ... | ... | ... |
| SK | MCS_1 | RK_1B |
| | MCS_2 | RK_2B |
| | ... | ... |
| | MCS_M | RK_MB |

ML_2

WIRELESS COMMUNICATION DEVICES FOR ADAPTIVE BEAMFORMING AND METHODS OF OPERATING THE SAME

CLAIM OF PRIORITY

This application claims priority to Korean Patent Application No. 10-2017-0123653, filed on Sep. 25, 2017, in the Korean Intellectual Property Office, the disclosure of which is incorporated herein by reference as if set forth in its entirety.

FIELD

The inventive concept relates generally to wireless communication devices, and more particularly, to a wireless communication devices for supporting adaptive beamforming of base stations and methods of operating the same.

BACKGROUND

A multi-antenna-based wireless communication system may enhance the data transmission rate by beamforming between transmitting and receiving ends in a cellular communication environment. The beamforming is generally performed based on a channel state between a base station and a wireless communication device, and in a general method of operating beamforming, a beamforming matrix or a beamforming steering matrix may be generated by using a channel estimated from a reference signal in a wireless communication device (or receiving end) and information on the beamforming matrix or the beamforming steering matrix (e.g., codebook) may be fed back to the base station (or transmitting end).

Studies on a wireless communication device for performing beamforming that may improve the performance of a wireless communication system have been conducted, and studies for reducing an amount of computation processes required for a feedback operation of a wireless communication device have also been conducted. Improvements may be desired.

SUMMARY

Some embodiments of the inventive concept provide a wireless communication device capable of generating feedback information required to perform beamforming for improving the performance of a wireless communication system with a reduced number of computations and a method of operating the wireless communication device.

Further embodiments of the present inventive concept provide methods of operating a wireless communication device for adaptive beamforming of a base station according to a state of a channel, the method including receiving a sounding packet from the base station through the channel; obtaining channel quality about the channel, using the sounding packet; selecting a feedback mode out of a plurality of feedback modes based on the channel quality; generating a matrix to be a basis of the adaptive beamforming, based on the selected feedback mode; and transmitting channel state information including information on the matrix to the base station.

Still further embodiments of the present inventive concept provide methods for operating a wireless communication device for adaptive beamforming of a base station according to a state of a channel including generating a diagonal matrix that includes singular values and a beamforming matrix from a channel matrix by performing singular value decomposition of the channel matrix corresponding to the channel; reading trigonometric values corresponding to a ratio of the singular values from a lookup table stored in a memory of the wireless communication device; generating a beamforming steering matrix by a multiplication computation of a rotation matrix generated by using the read trigonometric values and the beamforming matrix; and transmitting channel state information including information on the beamforming steering matrix to the base station.

Some embodiments of the present inventive concept provide methods of beamforming in a wireless communication system including a base station and a wireless communication device including receiving, by the wireless communication device, a sounding packet from the base station through a channel; transmitting, by the wireless communication device, information on a matrix generated based on a feedback mode selected according to channel quality of the channel to the base station; and receiving, by the wireless communication device, a data signal processed based on the beamforming according to the information on the matrix from the base station through the channel.

BRIEF DESCRIPTION OF THE DRAWINGS

Embodiments of the inventive concept will be more clearly understood from the following detailed description taken in conjunction with the accompanying drawings in which:

FIGS. 4A to 5B are diagrams illustrating operations of the link adaptor of FIG. 3 for selecting a feedback mode according to some embodiments of the present inventive concept.

FIGS. 7A to 8 are diagrams illustrating operations of the link adaptor of FIG. 6 in a geometric mean decomposition mode according to some embodiments of the present inventive concept.

FIGS. 10 and 11 are diagrams illustrating operations of the link adaptor of FIG. 6 for generating a channel quality indicator according to some embodiments of the present inventive concept.

DETAILED DESCRIPTION OF THE EMBODIMENTS

Figure 1:
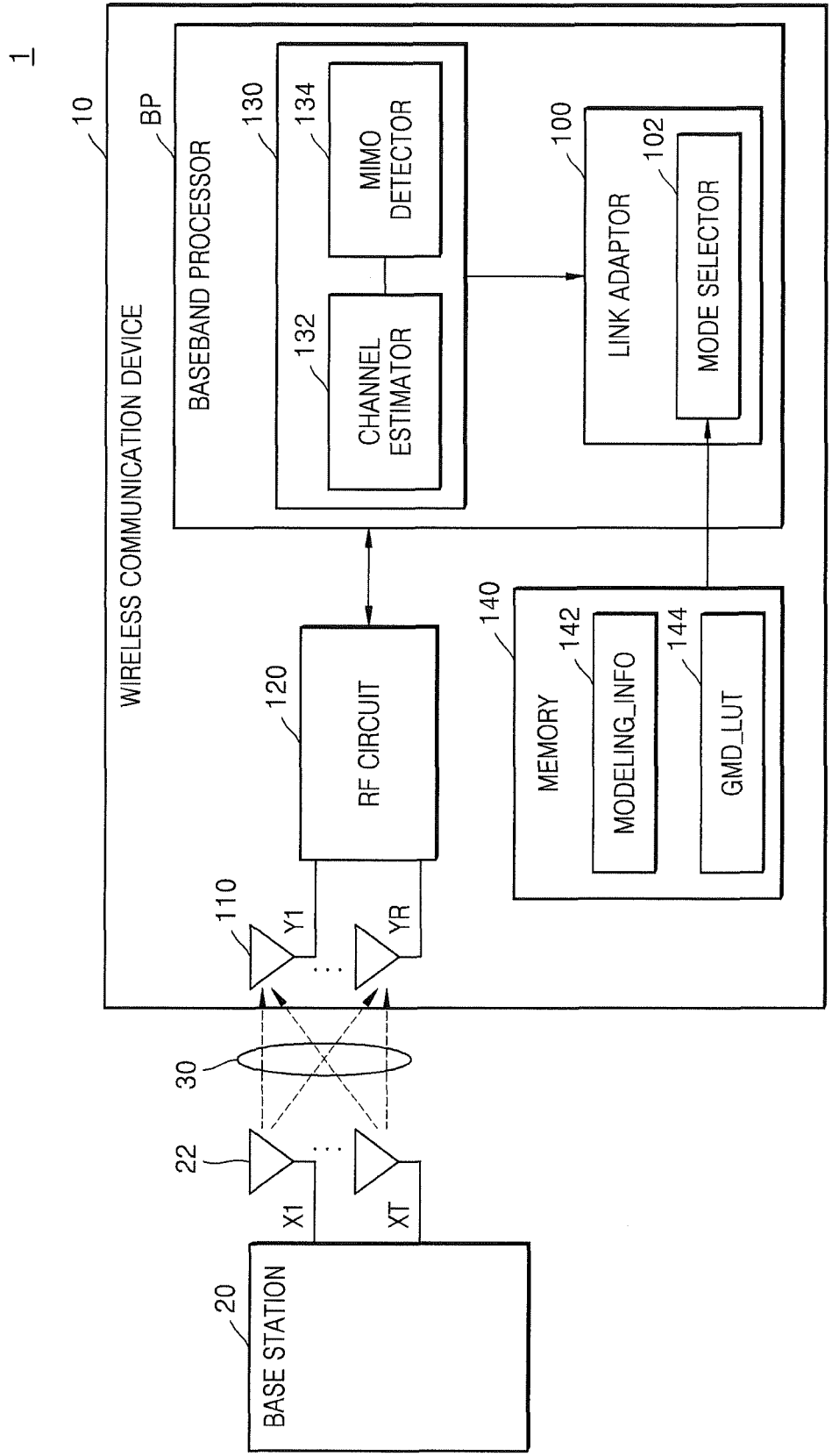
FIG. 1 is a block diagram illustrating a wireless communication system according to some embodiments of the present inventive concept.

Various embodiments will now be described more fully with reference to the accompanying drawings in which some embodiments are shown. The inventive concept may, however, be embodied in different forms and should not be construed as limited to the embodiments set forth herein. Rather, these embodiments are provided so that this disclosure is thorough and complete and fully conveys the inventive concept to those skilled in the art.

The terminology used herein to describe embodiments of the invention is not intended to limit the scope of the invention. The articles "a," "an," and "the" are singular in that they have a single referent; however, the use of the singular form in the present document should not preclude the presence of more than one referent. In other words, elements of the invention referred to in the singular form may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to," or "coupled to" another element or layer, it can be directly on, connected to, or coupled to the other element or layer or intervening elements or layers may be present. In contrast, when an element is referred to as being "directly on," "directly connected to," or "directly coupled to" another element or layer, there are no intervening elements or layers present. In the following explanation, the same reference numerals denote the same components throughout the specification.

Spatially relative terms, such as "beneath," "below," "lower," "above," "upper," and the like may be used herein to describe the relationship of one element or feature to another, as illustrated in the drawings. It will be understood that such descriptions are intended to encompass different orientations in use or operation in addition to orientations depicted in the drawings. For example, if a device is turned over, elements described as "below" or "beneath" other elements or features would then be oriented "above" the other elements or features. Thus, the term "below" is intended to mean both above and below, depending upon the orientation of the overall device.

Like numerals refer to like elements throughout the specification. Accordingly, the same numerals and similar numerals can be described with reference to other drawings, even if not specifically described in a corresponding drawing. Further, when a numeral is not marked in a drawing, the numeral can be described with reference to other drawings.

Referring first to FIG. 1, a block diagram illustrating a wireless communication system 1 according to some embodiments of the present inventive concept will be discussed. As illustrated in FIG. 1, the wireless communication system 1 may include a wireless communication device 10 and a base station 20, and the wireless communication device 10 may communicate with the base station 20 through a channel 30. The wireless communication system 1 may also be referred to as a multi-input multi-output (MIMO) system. The wireless communication system 1 may be, as a non-limiting example, a long term evolution (LTE) system, a code division multiple access (CDMA) system, a global system for mobile communications (GSM) system, a wireless local area network (WLAN) system or other arbitrary wireless communication systems. The wireless communication system 1 may include transmitting antennas 22 in the number of T and receiving antennas 110 in the number of R.

The wireless communication device 10 may be referred to as various devices capable of transmitting and receiving data and/or control information by communicating with the base station 20. For example, the wireless communication device 10 may be referred to as user equipment (UE), a mobile station (MS), a mobile terminal (MT), a user terminal (UT), a subscriber station (SS), a portable device, and the like. Furthermore, the base station 20 may refer to a fixed station communicating with the wireless communication device 10 and/or another base station and may transmit or receive data by communicating with the wireless communication device 10 and/or another base station. For example, the base station 20 may be referred to as a Node B, an evolved-Node B (eNB), a base transceiver system (BTS), and an access point (AP).

A wireless communication network between the wireless communication device 10 and the base station 20 may share available network resources so as to support communication between multiple users. For example, in a wireless communication network, information may be provided in various ways such as code division multiple access (CDMA), frequency division multiple access (FDMA), time division multiple access (TDMA), orthogonal frequency division multiple access (OFDMA), single carrier frequency division multiple access (SC-FDMA), and the like.

The wireless communication device 10 may include a plurality of receiving antennas 110, a radio frequency (RF) circuit 120, a baseband processor BP, and a memory 140. Each component included in the wireless communication device 10 may be a hardware block including an analog circuit and/or a digital circuit and may be a software block including a plurality of instructions executed by a processor or the like. The RF circuit 120 may receive a signal (e.g., a downlink signal) from the base station 20 via the plurality of receiving antennas 110. The received signal may be an RF signal having a high center frequency. The RF circuit 120 may include an analog down-conversion mixer, to generate a baseband signal by down-converting the frequency of the received signal. Furthermore, the RF circuit 120 may further include an analog-to-digital converter to perform processing operations such as converting a baseband signal to a digital signal. The baseband processor BP may include a link adaptor 100 and the demodulator 130. Hereinafter, each of the link adaptor 100 and the demodulator 130 is illustrated as one block which is included in the baseband processor BP but is not limited thereto. The baseband processor BP may be an integrated logic block capable of performing a series of operations of the link adaptor 100 and the demodulator 130. The demodulator 130 may include a channel estimator 132 and a MIMO detector 134. The channel estimator 132 may estimate the state of the channel 30 using a reference signal included in the signal received from the base station 20. In some embodiments, the received signal used for channel estimation may be referred to as a sounding packet or a null data packet. The MIMO detector 134 may demodulate a data signal received from the base station 20 including a plurality of transmitting antennas 22. The link adaptor 100 may receive information on the estimated channel from the demodulator 130. The link adaptor 100 may generate channel state information based on the information on the estimated channel. The channel state information may include at least one of a channel quality indicator CQI, a precoding matrix indicator PMI, and a rank indicator RI.

Hereinafter, operations of the link adaptor 100 according to some embodiments of the inventive concept will be discussed, and it is assumed that the wireless communication system 1 is a rank-2 wireless local area network system, and thus, the wireless communication device 10 and the base station 20 may perform wireless communication using respectively two transmitting antennas 22 and two receiving antennas 110. However, the wireless communication system 1 is assumed to be a rank-2 wireless local area network system for convenience sake, and it is obvious that the inventive concept is not limited thereto. The inventive concept may be applied to various ranks and various networks.

First, when the base station 20 transmits signals X1 to X2 through the transmitting antennas 22, the wireless communication device 10 may receive signals Y1 to Y2 through the receiving antennas 110. The received signals Y1 to Y2 are the results of the channel 30, and the relationship between the transmitted signals X1 to X2 and the received signals Y1 to Y is described by Equation (1).

$$Y = H \cdot X + N \tag{1}$$

Each element of Equation (1) may be a vector or a matrix. 'N' may mean white Gaussian noise, and 'Y' may mean the received signals Y1~Y2 and may be a 2×1 matrix. 'X' may mean the transmitted signals X1 to X2 and may be a 2×1 matrix. 'H' may mean a channel matrix and may be a 2×2 matrix.

'H' may represent the frequency response between the base station 20 and the wireless communication device 10. The channel estimator 132 may generate the channel matrix H by estimating the channel 30. In some embodiment, the link adaptor 100 may include a mode selector 102, and the mode selector 102 may obtain channel quality for the channel 30 and may select any one of a plurality of feedback modes based on the channel quality. Furthermore, the mode selector 102 may refer to modeling information 142 stored in the memory 140 and may read information corresponding to the channel quality from modeling information 142 to select a feedback mode. The channel quality may be a value corresponding to various factors. The channel quality may be a signal-to-noise ratio (SNR) or a signal to interference plus noise ratio (SINR) of the channel 30 and, in some embodiments, may be signal power received from the base station 20. Furthermore, in accordance with some embodiments, the wireless communication system 1 based on spatial multiplexing is assumed. Thus, the channel 30 may include a plurality of subchannels, and the channel quality may be a value indicating total quality of the plurality of subchannels. However, it will be understood that this is provided as an example only and, therefore, embodiments of the present inventive concept are not limited thereto. Various indicators that may indicate channel quality may be referred to in selecting a feedback mode.

The link adaptor 100 may generate information on a precoding matrix indicator PMI based on the selected feedback mode. In this regard, the link adaptor 100 may change a feedback mode depending on the channel quality to generate channel state information including a precoding matrix indicator PMI. Thus, the performance of the wireless communication device 10 may be improved, and the beamforming corresponding to the state of the channel 30 of the base station 20 may also be performed so that the performance of the wireless communication system 1 may be improved. The specific operation of the mode selector 102 will be described below with reference to FIGS. 3 to 5B. Hereinafter, operations according to a feedback mode will be described.

Feedback modes may include, for example, singular value decomposition (SVD) mode and geometric mean decomposition (GMD) mode. Hereinafter, the feedback modes are mainly described as including SVD mode and GMD mode.

First, when the link adaptor 100 operates in SVD mode, it may decompose the channel matrix H into singular values as shown in Equation (2).

$$H = U\Sigma V^* \tag{2}$$

'U' and 'V' may be a unitary matrix, and 'Σ' may be a diagonal matrix including non-negative singular values of the channel 30 (e.g., σ1 and σ2). 'V*' may be a conjugate transpose matrix of 'V'. Furthermore, 'U*' may be a conjugate transpose matrix of 'U', and the baseband processor BP may apply 'U*' to the channel matrix H. The link adaptor 100 may generate 'V' by using 'V*', and 'V' may mean a beamforming matrix. The link adaptor 100 may generate a precoding matrix indicator PMI based on the beamforming matrix V. The beamforming matrix V may be referred to as a precoding matrix used in beamforming at the base station 20. The wireless communication device 10 may transmit channel state information including a precoding matrix indicator PMI to the base station 20, and the base station 20 may perform adaptive beamforming based on the precoding matrix indicator PMI. The relationship between the transmitted signals X1 to X2 and the received signals Y1 to Y2 is given by Equation (3).

$$Y = H \cdot V \cdot X + N \tag{3}$$

If applying 'U*' to 'Y' in the baseband processor BP of the wireless communication device 10 in Equation (3), the following Equation (4) may be derived.

$$Y' = U^*Y = U^*(H \cdot V \cdot X + N) = U^* \cdot (U\Sigma V^* \cdot V \cdot X + N) = \Sigma X + N' \tag{4}$$

Thus, because of adaptive beamforming of the base station 20, the received signals Y1 to Y2 are defined as a result of applying singular values and noise N' of the channel 30 to the transmitted signals X1 to X2.

When the link adaptor 100 operates in GMD mode, a beamforming steering matrix VF may be generated as the following Equation (5) by using the beamforming matrix V generated as a result of singular value decomposition of the channel matrix H.

$$VF = V \cdot \begin{bmatrix} \cos\psi & -\sin\psi \\ \sin\psi & \cos\psi \end{bmatrix} = V \cdot \begin{bmatrix} \dfrac{\sqrt{\mu^2 - \sigma 2^2}}{\sqrt{\sigma 1^2 - \sigma 2^2}} & -\dfrac{\sqrt{\sigma 1^2 - \mu^2}}{\sqrt{\sigma 1^2 - \sigma 2^2}} \\ \dfrac{\sqrt{\sigma 1^2 - \mu^2}}{\sqrt{\sigma 1^2 - \sigma 2^2}} & \dfrac{\sqrt{\mu^2 - \sigma 2^2}}{\sqrt{\sigma 1^2 - \sigma 2^2}} \end{bmatrix} \tag{5}$$

$$(단, \mu = \sqrt{\sigma 1 \cdot \sigma 2})$$

'F' may be a 2×2 rotation matrix, and the trigonometric values of 'F' may be defined as Equation (5) based on the singular values of the diagonal matrix Σ (e.g., σ1 and σ2). The link adaptor 100 according to some embodiments of the inventive concept may reduce the amount of computations required to generate the rotation matrix F. In some embodiments, the link adaptor 100 may refer to a look-up table 144 stored in the memory 140 in GMD mode and thus, may generate the rotation matrix F without unnecessary computations. This may reduce the complexity of the hardware implementation of the baseband processor BP and may also reduce the size of a chip set for wireless communication, including the baseband processor BP. Such specific operation of the link adaptor 100 will be discussed below with reference to FIGS. 6 to 8.

Figure 2:
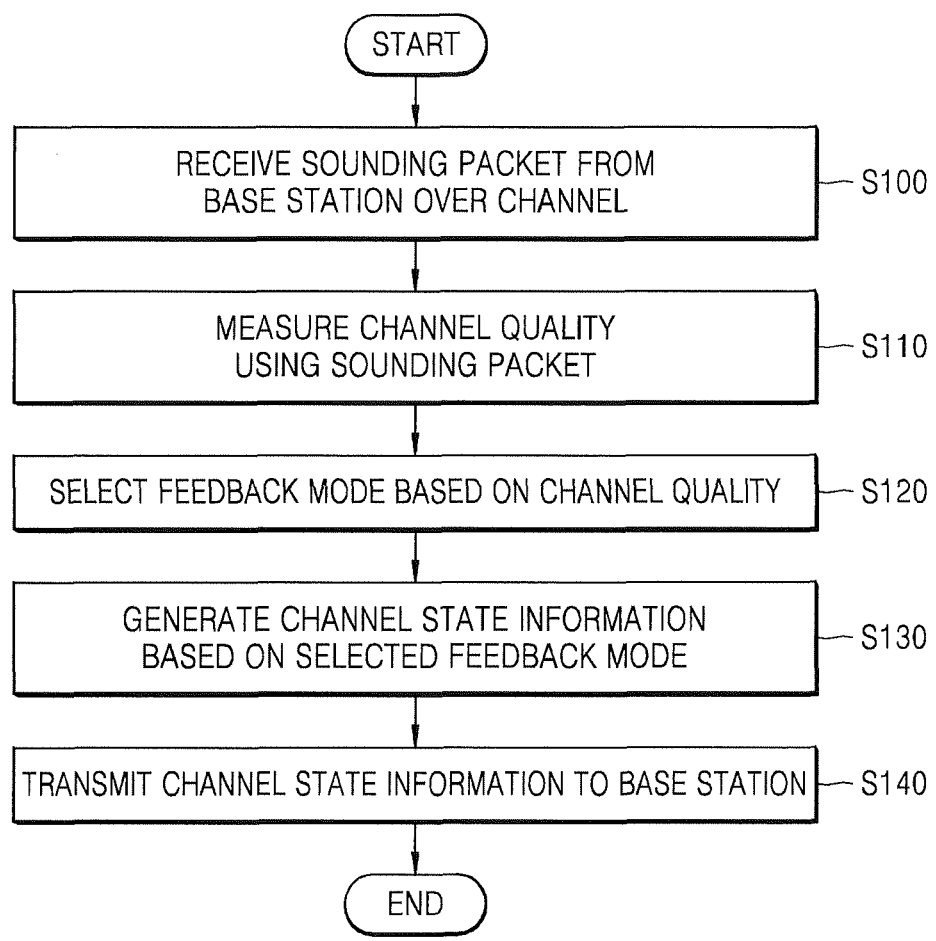
FIG. 2 is a flowchart illustrating operations of the wireless communication device of FIG. 1 according to some embodiments of the present inventive concept.

Referring now to FIG. 2, a flowchart illustrating operations of the wireless communication device 10 of FIG. 1 according to some embodiments of the inventive concept will be discussed. As illustrated in FIG. 2, operations begin by receiving at the wireless communication device 10 a predetermined sounding packet (or a predetermined signal) from the base station 20 over the channel 30 (block S100). The wireless communication device 10 may obtain the channel quality using the received sounding packet (block S110). In some embodiments, the wireless communication device 10 may obtain the channel quality by measuring the SNR of the wireless communication device 10 using a sounding packet when the channel quality factor is the SNR. The wireless communication device 10 may select a feedback mode for generating feedback information for the precoding matrix indicator PMI based on the channel quality (block S120). The wireless communication device 10 may generate channel state information including the precoding matrix indicator PMI based on the selected feedback mode (block S130). Furthermore, the wireless communication device 10 may determine a recommended MCS out of a plurality of modulation and coding schemes (MCS) based on the information and the channel quality on the selected feedback mode. The wireless communication device 10 may generate a channel quality indicator CQI indicating the determined recommended MCS and the channel state information may include the channel quality indicator CQI. The wireless communication device 10 may transmit the channel state information to a base station 20 (block S140). Then, the base station 20 may perform beamforming when a data signal is transmitted to the wireless communication device 10 based on the precoding matrix indicator PMI of the channel state information.

Figure 3:
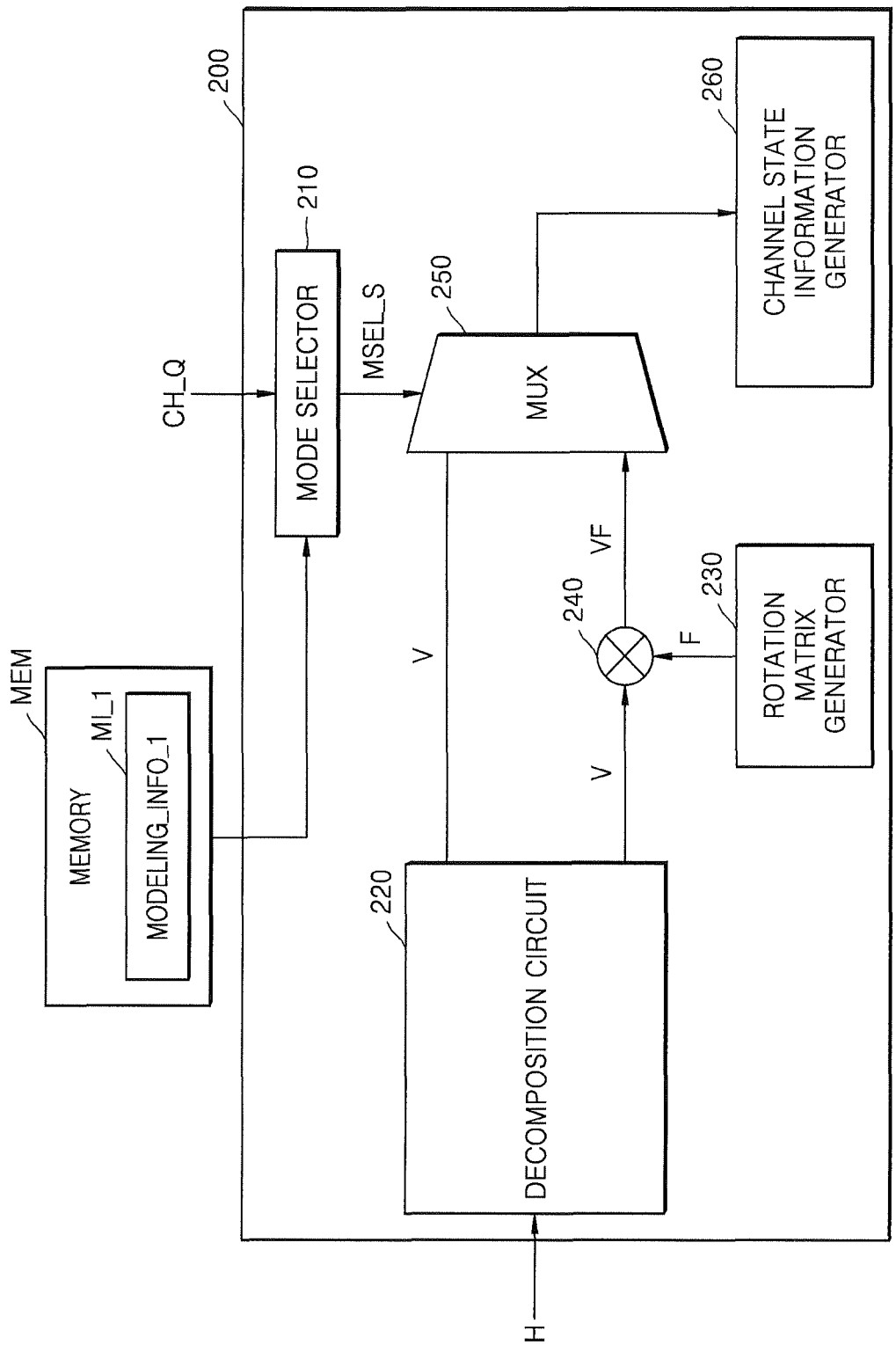
FIG. 3 is a block diagram illustrating a link adaptor according to some embodiments of the present inventive concept.

FIG. 3 is a block diagram illustrating a link adaptor 200 according to some embodiments of the inventive concept. FIG. 4A to 5B illustrate how the link adaptor 200 of FIG. 3 selects a feedback mode. Referring first to FIG. 3, the link adaptor 200 may include a mode selector 210, a decomposition circuit 220, a rotation matrix generator 230, a matrix multiplier 240, a multiplexer 250, and a channel state information generator 260. In some embodiments, the mode selector 210 may receive a channel quality CH_Q, and the performance of a wireless communication device corresponding to each of a plurality of feedback modes may be predicted under the condition of the channel quality CH_Q. The performance of a wireless communication device may be a value corresponding to various factors. The performance of a wireless communication device may be a data rate for a signal that the wireless communication device may transmit to a base station and in some embodiments, may be a packet error rate for a signal that the wireless communication device received. Furthermore, the performance of a wireless communication device may be a combination of a data rate and a packet error rate of the wireless communication device. However, it will be understood that this is merely an example and the inventive concept is not limited thereto. Various indicators that may indicate the performance of a wireless communication device may be referred to in selecting a feedback mode. Furthermore, the performance of a wireless communication device, predicted by the mode selector 210, may be defined before wireless communication starts between the wireless communication device and the base station.

In some embodiments, the mode selector 210 may refer to first modeling information MI_1 stored in a memory MEM of a wireless communication device to predict the performance of the wireless communication device under the condition of the channel quality CH_Q. The first modeling information MI_1 may include information modeling the performance of a wireless communication device according to a channel quality condition and a feedback mode. Hereinafter, it is assumed that the channel quality CH_Q is based on an SNR, and the performance of a wireless communication device is based on a data rate.

Referring to FIG. 4A, the first modeling information MI_1 may include an SNR field, a feedback mode FB_MODE field, and a data rate DATA RATE field. The first modeling information MI_1 may be information in which the data rate DATA RATE is each mapped according to an SNR condition and feedback mode FB_MODE. As an example, when the mode selector 210 receives the value of 'S1' as the channel quality CH_Q, the mode selector 210 may refer to the first modeling information MI_1 to read information corresponding to 'S1'. In other words, the mode selector 210 may read 'R1_A' corresponding to an SVD mode and 'R1_B' corresponding to a GMD mode from the first modeling information MI_1. Next, the mode selector 210 may compare the value of 'R1_A' with the value of 'R1_B' to select a feedback mode based on the result of the comparison. For example, the mode selector 210 may select the GMD mode when the value of 'R1_B' is greater than the value of 'R1_A'.

An operation in which the mode selector 210 selects a feedback mode, according to some embodiments of the present disclosure, is as follows. Referring to FIG. 4B, after performing S110 of FIG. 1, the mode selector 210 may refer to the first modeling information MI_1 to read values of data rate DATA RATE of the wireless communication device corresponding to the value of SNR, which is the channel quality CH_Q, from the first modeling information MI_1 (block S122A). The mode selector 210 may compare the value of data rate DATA RATE corresponding to the SVD mode with the value of data rate DATA RATE corresponding to the GMD mode (block S124A). The mode selector 210 may select a feedback mode based on the comparison result (block S126A). Then, operation S130 of FIG. 2 may be performed.

Furthermore, the first modeling information MI_1 may include information defining a feedback mode selected according to an SNR interval, unlike FIG. 4A. Further referring to FIG. 5A, the first modeling information MI_1 may be information indicating that the SVD mode is a feedback mode selected when the SNR value is included in a first feedback mode selection interval INTV1, for example, when the SNR value is included in 'SA~SB' or in 'SC~SD'. Furthermore, the first modeling information MI_1 may be information indicating that the GMD mode is a feedback mode selected when the SNR value is included in a second feedback mode selection interval INTV2, for example, when the SNR value is included in 'SB~SC' or in 'SD~SE'. The mode selector 210 may refer to the first modeling information MI_1 to select a feedback mode.

Figure 5A:
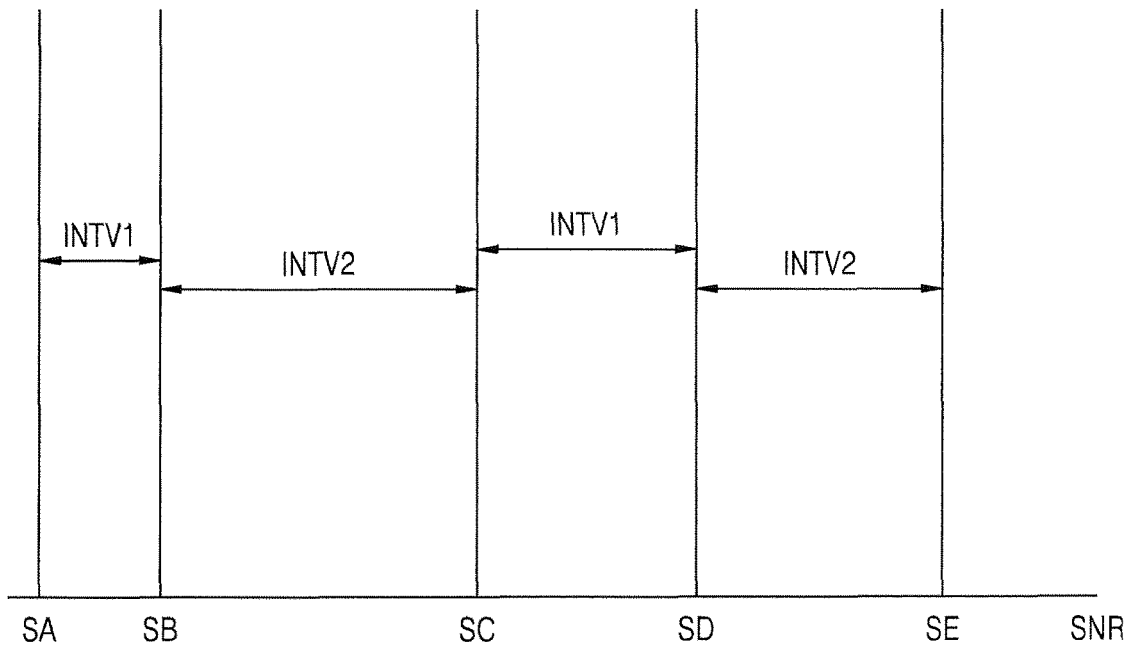
Figure 5B:
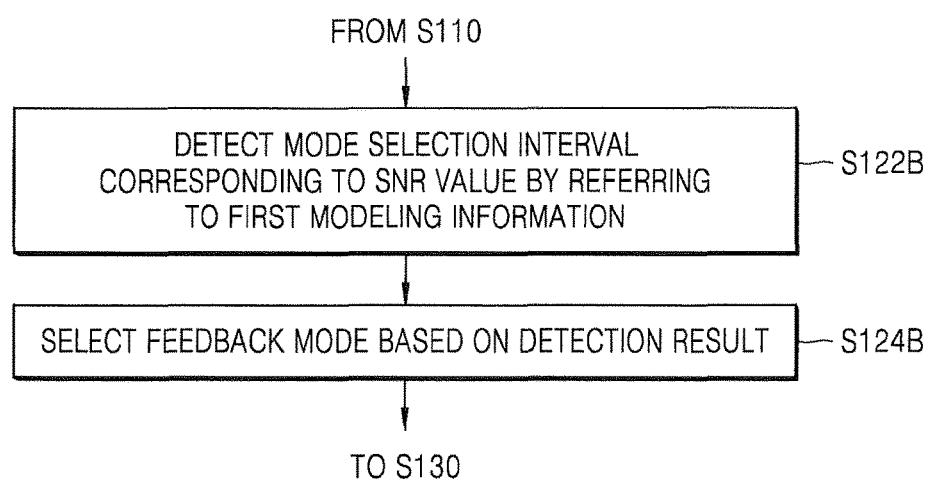

The mode selector 210 according to some embodiments of the inventive concept selects a feedback mode as follows. Referring to FIG. 5B, after performing operation S110 of FIG. 1, the mode selector 210 may refer to first modeling information to detect a feedback mode selection interval corresponding to the SNR value, which is the channel quality CH_Q (block S122B). The mode selector 210 may select a feedback mode based on the detection result (block S124B). Then, operation S130 of FIG. 2 may be performed.

Referring to FIG. 3, the mode selector 210 may generate a feedback mode selection signal MSEL_S according to the selected feedback mode, thereby providing the feedback mode selection signal MSEL_S to the multiplexer 250. The multiplexer 250 may receive the beamforming matrix V and the beamforming steering matrix VF. As discussed above, the beamforming matrix V may be generated by singular value decomposition of the decomposition circuit 220, and the beamforming steering matrix VF may be generated by matrix multiplication of the rotation matrix F with the beamforming matrix V. In some embodiments, the rotation matrix generator 230 may generate the rotation matrix F based on singular value decomposition of the decomposition circuit 220, and the detailed description thereof will be provided with reference to FIGS. 6 to 7B.

The multiplexer 250 may select one of the beamforming matrix V and the beamforming steering matrix VF based on the feedback mode selection signal MSEL_S to provide the selected matrix to the channel state information generator 260. In some embodiments, when the SVD mode is selected, the multiplexer 250 may provide the beamforming matrix V to the channel state information generator 260, whereas, when the GMD mode is selected, the beamforming steering matrix VF may be provided to the channel state information generator 260.

The channel state information generator 260 may generate a precoding matrix indicator PMI by using the beamforming matrix V or the beamforming steering matrix VF received from the multiplexer 250.

As discussed above, the link adaptor 200 according to the inventive concept may select a feedback mode according to the channel state and may generate channel state information based on the selected feedback mode to generate accurate beamforming of the base station so that the performance of the wireless communication system is improved.

Figure 6:
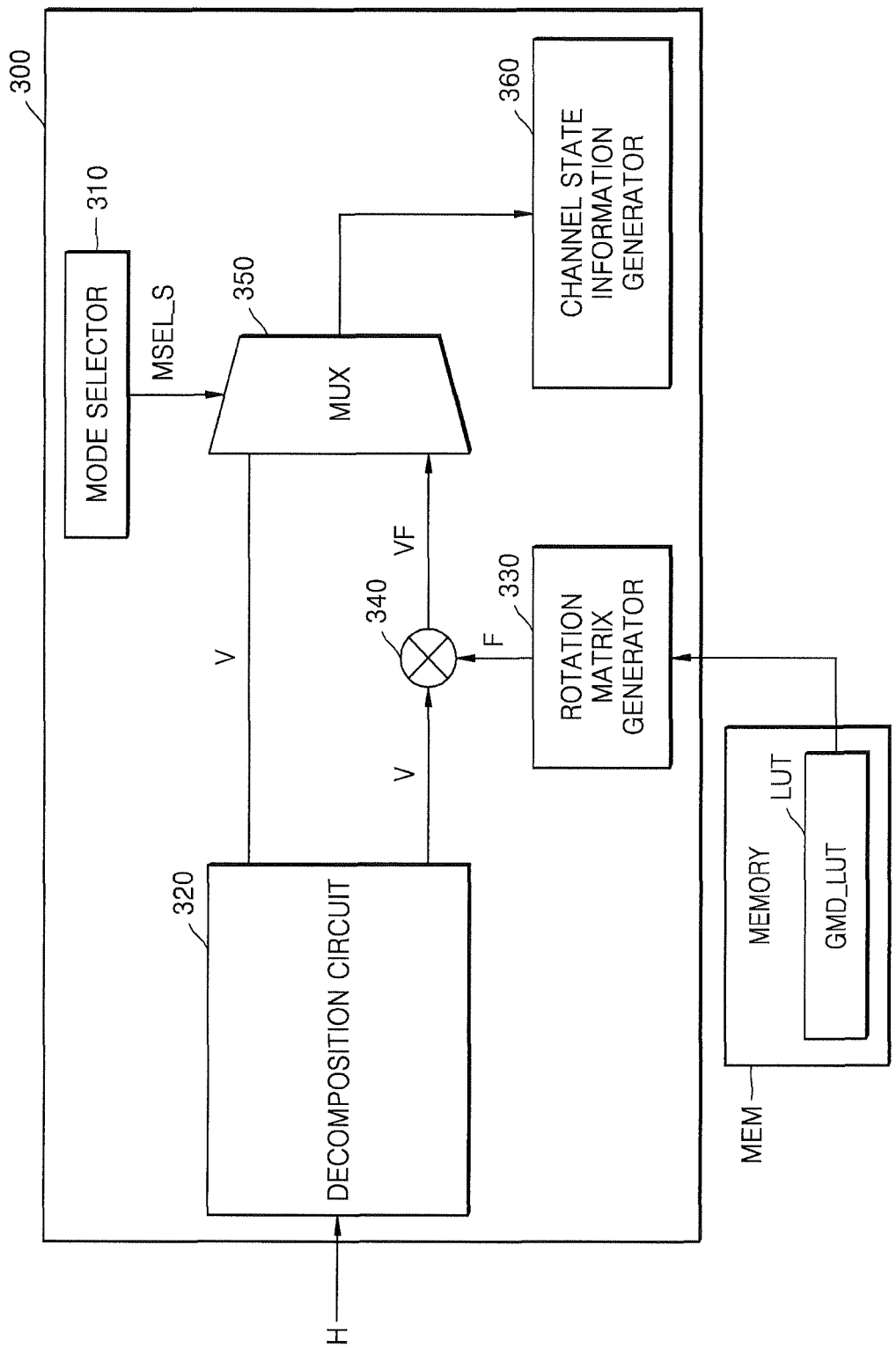
FIG. 6 is a block diagram illustrating a link adaptor according to some embodiments of the present inventive concept.
Figure 8:
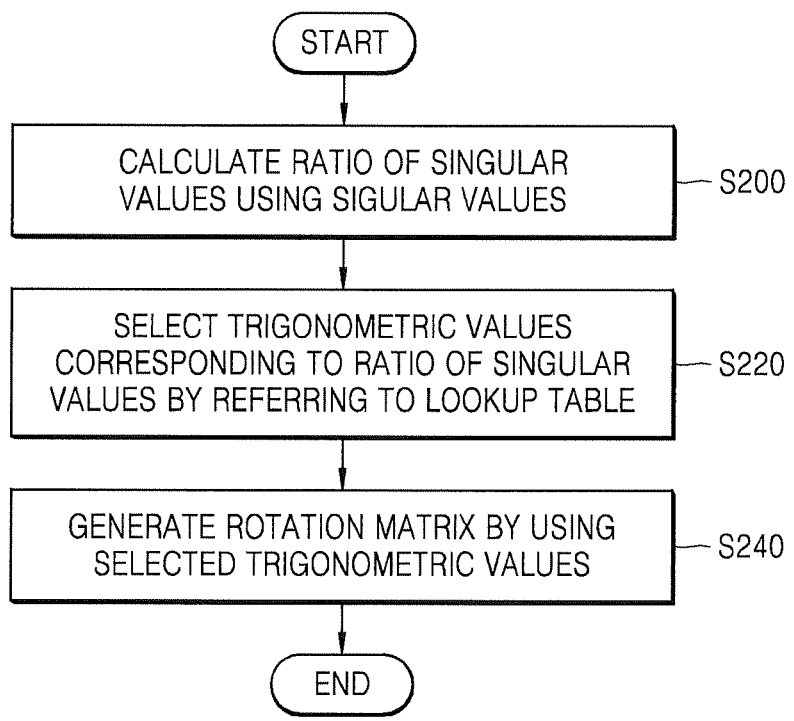

FIG. 6 is a block diagram illustrating a link adaptor 300 according to some embodiments of the inventive concept. FIGS. 7A to 8 are diagrams illustrating how the link adaptor 300 of FIG. 3 operates in a GMD mode. Referring first to FIG. 6, the link adaptor 300 may include a mode selector 310, a decomposition circuit 320, a rotation matrix generator 330, a matrix multiplier 340, a multiplexer 350, and a channel state information generator 360. Hereinafter, operations of the decomposition circuit 320, the rotation matrix generator 330, and the matrix multiplier 340 under the GMD mode will be mainly described, and descriptions of the other components will be omitted since they are described with reference to FIG. 3.

The decomposition circuit 320 may perform singular value decomposition of a channel matrix generated by estimating a channel between a base station and a wireless communication device. The decomposition circuit 320 may generate singular values σ1 and σ2 by singular value decomposition to provide them to the rotation matrix generator 330. As an example, the singular values σ1 and σ2 may be values included in the diagonal matrix Σ of Equation (2). Furthermore, the channel between the base station and the wireless communication device may include a first subchannel and a second subchannel, and the singular value σ1 may be a value indicating the state of the first subchannel, and the singular value σ2 may be a value indicating the state of the second subchannel.

The rotation matrix generator 330 may generate the rotation matrix F by using the singular values σ1 and σ2 and a lookup table LUT stored in the memory MEM. In some embodiments, the rotation matrix generator 330 may calculate the ratio of the singular value σ1 to the singular value σ2. The 'γ' corresponding to the ratio of the singular value σ1 to the singular value σ2 may be defined as the following Equation (6).

$$\gamma = \frac{\sigma 1}{\sigma 2} \quad (6)$$

By substituting Equation (6) into Equation (5), the rotation matrix F may be expressed as Equation (7).

$$F = \begin{bmatrix} \cos\psi & -\sin\psi \\ \sin\psi & \cos\psi \end{bmatrix} = \begin{bmatrix} \frac{1}{\sqrt{\gamma+1}} & \frac{-\sqrt{\gamma}}{\sqrt{\gamma+1}} \\ \frac{\sqrt{\gamma}}{\sqrt{\gamma+1}} & \frac{1}{\sqrt{\gamma+1}} \end{bmatrix} \quad (7)$$

(단, $\gamma \leftrightarrows 1 < \gamma < \infty$)

As Equation (7), the rotation matrix generator 330 may generate the rotation matrix F by using the ratio of singular values γ. In some embodiments, the rotation matrix generator 330 may refer to the lookup table LUT stored in the memory MEM so that an amount of computations required to generate the rotation matrix F is minimized. In other words, the rotation matrix generator 330 may directly read the required values from the lookup table LUT and generate the rotation matrix F using the read values without performing a root computation or a fraction computation of the ratio of singular values γ. The ratio of singular values γ may be a value between '1' and '∞', and an angle ψ according to the ratio of singular values γ may have a value between π/4 (or 45°) and π/2 (or 90°).

Referring to FIG. 7A, a lookup table LUT_1 may include a field indicating a reference angle REF_DEGREE having a constant interval within a range of the angle ψ, a field indicating trigonometric values cos(ψ) and sin(ψ) corresponding to each reference angle REF_DEGREE, and a field indicating a reference ratio REF_RATIO. In some embodiments, the lookup table LUT_1 may include information on the reference angles REF_DEGREE having a constant interval of '5°' starting from '45°'. In other words, the lookup table LUT_1 may include information on the reference angles REF_DEGREE that are set by dividing a range of the angle ψ generated from the ratio of singular values γ into 10 intervals.

The rotation matrix generator 330 may calculate the ratio of singular values γ and refer to the lookup table LUT_1 in order to detect the reference ratio REF_RATIO corresponding to the ratio of singular values γ. The rotation matrix generator 330 may read trigonometric values cos(ψ) and sin(ψ) corresponding to the detected reference ratio REF_RATIO from the lookup table LUT_1. Specifically, the rotation matrix generator 330 may detect the reference ratio REF_RATIO equal to or closest to the ratio of singular values γ. The rotation matrix generator 330 may use the read trigonometric values cos(ψ) and sin(ψ) to generate the rotation matrix F, thereby minimizing the amount of computations.

For example, the rotation matrix generator 330 may refer to the lookup table LUT_1 and detect the reference ratio REF_RATIO equal to or closest to '3' when the calculated ratio of singular values γ is '3'. The rotation matrix generator 330 may read the trigonometric values cos(60) and sin(60) corresponding to the reference ratio REF_RATIO of '3', which are '0.5' and '0.866', respectively. The rotation matrix generator 330 may easily obtain the rotation matrix F as shown in Equation (8) using the read values.

$$F = \begin{bmatrix} \cos 60 & -\sin 60 \\ \sin 60 & \cos 60 \end{bmatrix} = \begin{bmatrix} 0.5 & -0.866 \\ 0.866 & 0.5 \end{bmatrix} \quad (8)$$

FIG. 7B shows, unlike FIG. 7A, a lookup table LUT_2 in which an interval between reference angles REF_DEGREE is set as '10°'. In other words, an interval between reference angles REF_DEGREE in the lookup table LUT_2 may vary, and the lookup table LUT_2 may include trigonometric values cos(ψ) and sin(ψ) and the reference ratio REF_RATIO corresponding to each of the reference angles REF_DEGREE. However, the examples shown in FIGS. 7A and 7B are exemplary, but not limiting. An interval between reference angles REF_DEGREE may vary, and the lookup tables LUT_1 and LUT_2 may include various kinds of information that may be read immediately when the rotation matrix generator 330 generates the rotation matrix F.

Referring to FIG. 6, in some embodiments, an update to the lookup table LUT may be performed based on the communication environment between a base station and a wireless communication device. Update targets may be an interval between reference angles REF_DEGREE, trigonometric values cos(ψ) and sin(ψ) corresponding to each of the reference angles REF_DEGREE, and a reference ratio REF_RATIO. As an example, when more precise beamforming is required, an update may be performed to be a lookup table LUT which is set to have a small interval between reference angles REF_DEGREE, whereas, when it is required to drastically reduce the load of a wireless communication device, an update may be performed to be a lookup table LUT which is set to have a large interval between reference angles REF_DEGREE.

The rotation matrix generator 330 according to some embodiments of the inventive concept generates the rotation matrix F in the following manner. Referring to FIG. 8, the rotation matrix generator 330 may calculate the ratio of singular values γ using the singular values σ1 and σ (S200). The rotation matrix generator 330 may refer to the lookup table LUT of the memory MEM to select the trigonometric values cos(ψ) and sin(ψ) corresponding to the ratio of singular values γ (S220). The rotation matrix generator 330 may generate the rotation matrix F using the selected trigonometric values cos(ψ) and sin(ψ) (S240).

Figure 9:
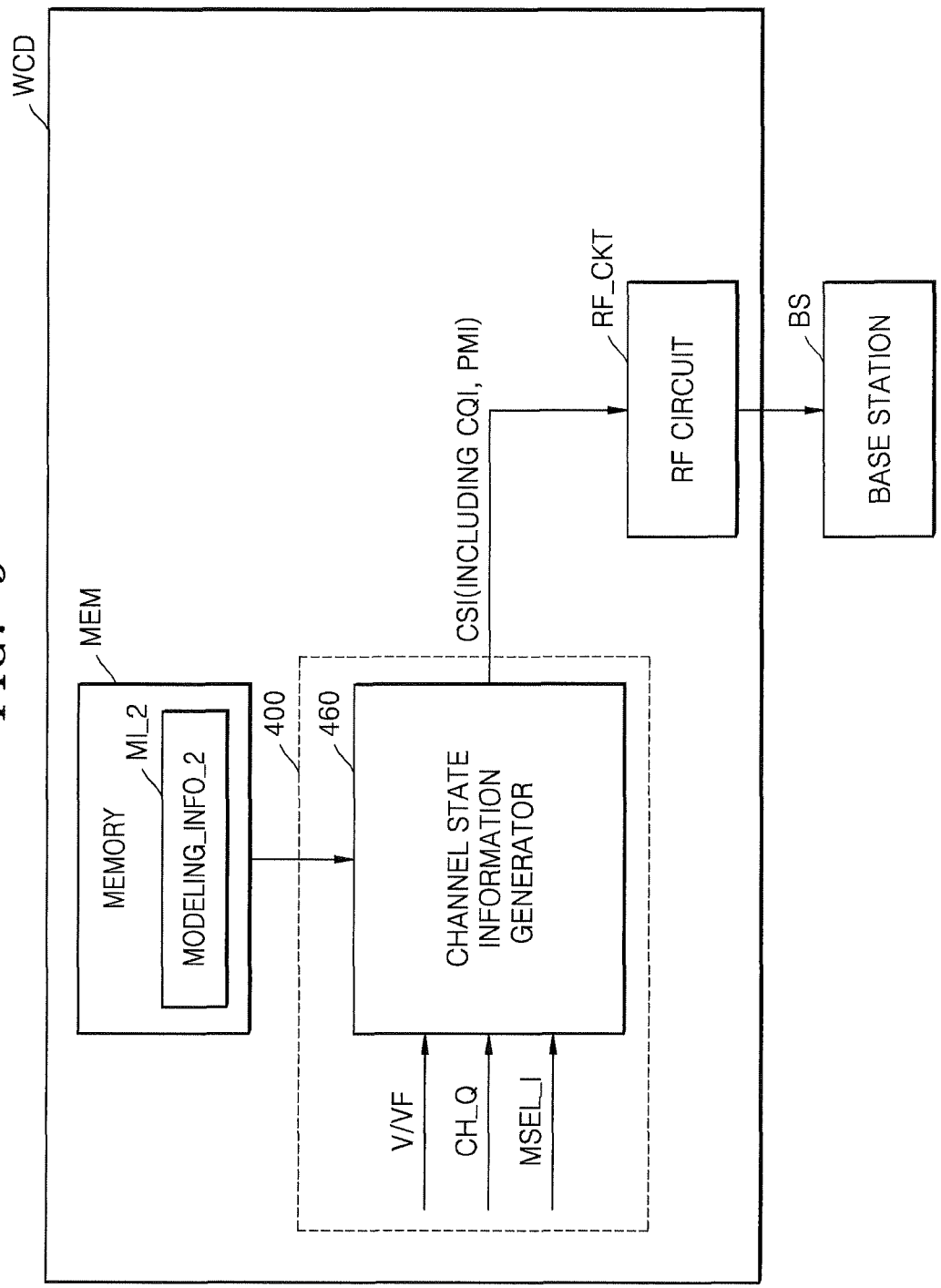
FIG. 9 is a block diagram illustrating a wireless communication device according to some embodiments of the present inventive concept.
Figure 11:
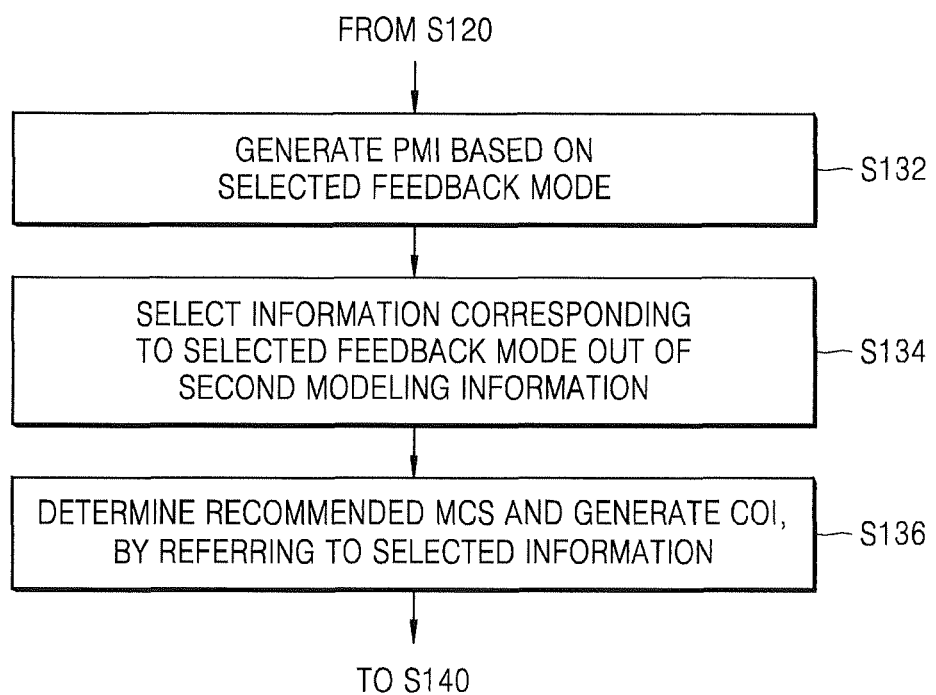

FIG. 9 is a block diagram illustrating a wireless communication device WCD according to some embodiments of the inventive concept, and FIGS. 10 and 11 are diagrams illustrating how to generate a channel quality indicator CQI of the link adaptor 400 of FIG. 9.

Referring to FIG. 9, the wireless communication device WCD may include a memory MEM, the link adaptor 400, and the RF circuit RF_CKT. A channel state information generator 460 may receive the beamforming matrix V or the beamforming steering matrix VF and may generate a precoding matrix indicator PMI using the beamforming matrix V or the beamforming steering matrix VF. In some embodiments, the channel state information generator 460 may receive the channel quality CH_Q and information on the selected feedback mode MSEL_I. The channel state information generator 460 may select a recommended MCS out of a plurality of MCSs based on the channel quality CH_Q and the information on the selected feedback mode MSEL_I.

Furthermore, when the recommended MCS is determined, the channel state information generator 460 may refer to second modeling information MI_2 stored in the memory MEM. The second modeling information MI_2 may include, for each feedback mode, modeling information on the performance of a wireless communication device according to channel quality conditions and MCS. Hereinafter, it is assumed that the channel quality CH_Q is based on the SNR, and the performance of a wireless communication device is based on a data rate.

Referring to FIG. 10, the second modeling information MI_2 may include first information MI_2A and second information MI_2B that are distinguished as feedback modes SVD_MODE and GMD_MODE, respectively. Each of the first and second information MI_2A and MI_2B may include an SNR field, an MCS field, and a data rate DATA RATE field. Each of the first and second information MI_2A and MI_2B may be information in which each data rate DATA RATE is mapped according to SNR conditions and MCS.

For example, when the channel state information generator 460 may receive an 'S1' value as the channel quality CH_Q and may also receive the information on the selected feedback mode MSEL_I in which the SVD mode SVD_MODE is selected, the channel state information generator 460 may select the first information MI_2A of the second modeling information MI_2 to read information corresponding to 'S1'. In other words, the channel state information generator 460 may read data rates R1_1A to R1_MA of the wireless communication device WCD respectively corresponding to a plurality of MCSs MCS_1 to MCS_M that correspond to 'S1', from the first information MI_2A. The channel state information generator 460 may compare the read data rates R1_1A to R1_MA with each other and may determine a recommended MCS based on the comparison result. For example, the channel state information generator 460 may determine an MCS corresponding to the greatest data rate as the recommended MCS.

The recommended MCS of the link adaptor 400 according to some embodiments of the inventive concept is determined as follows. After performing operation S120 of FIG. 1, the link adaptor 400 may generate a precoding matrix indicator PMI based on the selected feedback mode (S132). The link adaptor 400 may select information corresponding to the selected feedback mode out of the second modeling information MI_2 of the memory MEM (S134). The link adaptor 400 may refer the selected information to determine a recommended MCS and may generate a channel quality indicator CQI (S134). Then, operation S140 of FIG. 1 may be performed.

Referring to FIG. 9, as described above, the channel state information generator 460 may determine a recommended MCS based on the information on the selected feedback mode MSEL_I and the channel quality CH_Q and generate a channel quality indicator CQI including information on the determined recommended MCS. The channel state information generator 460 may transmit channel state information CSI including the precoding matrix indicator PMI and the channel quality indicator CQI that are generated as described above to a base stations BS through the RF circuit RF_CKT. The base station BS may perform an operation such as beamforming based on the channel state information CSI to perform wireless communication with the wireless communication device WCD.

Figure 12:
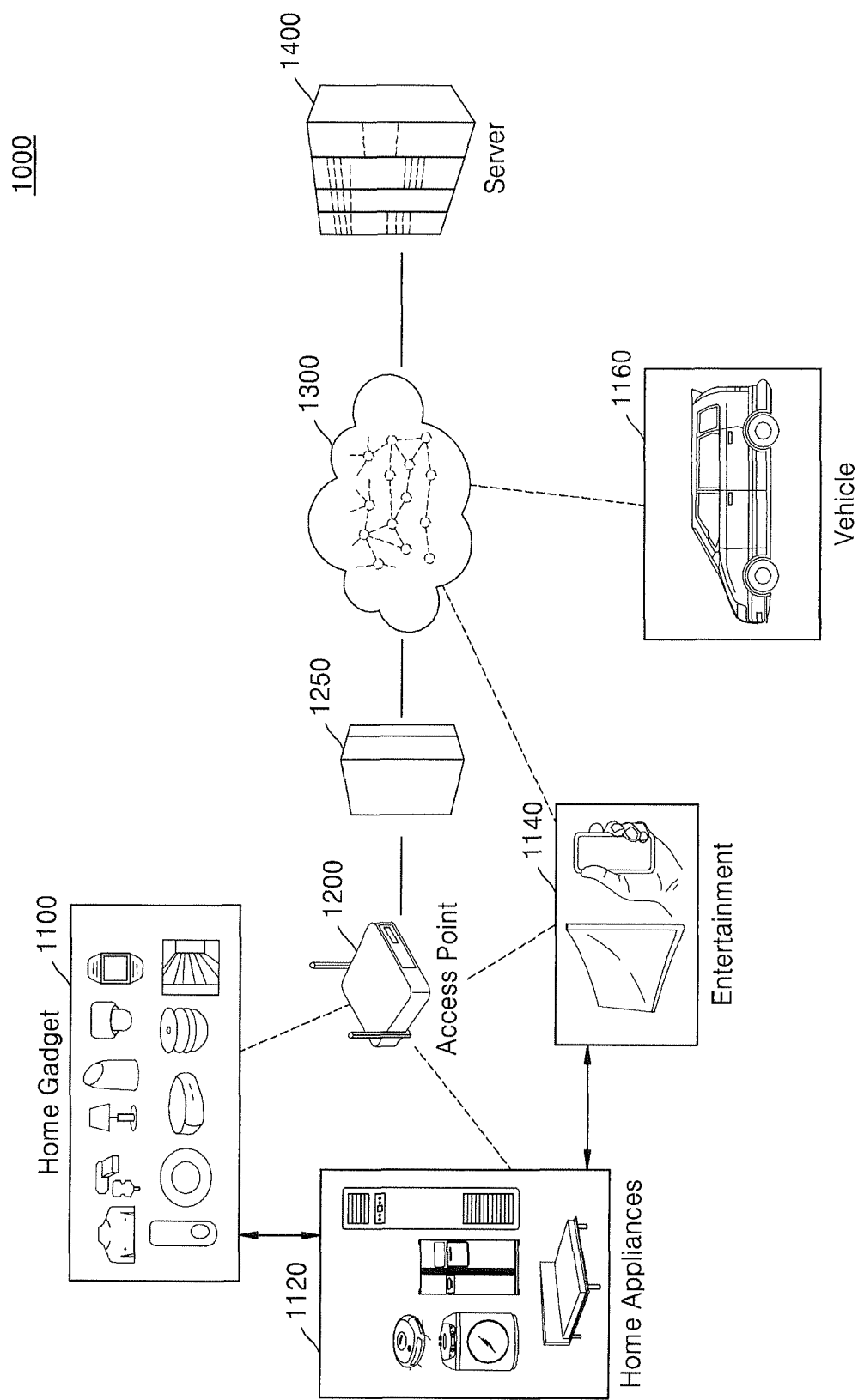
FIG. 12 is a diagram illustrating a conceptual diagram of an Internet of Things (IoT) network in which some embodiments of the inventive concept may be used.

FIG. 12 illustrates an Internet of Things (IoT) network system 1000 to which embodiments of the inventive concept are applied. As illustrated in FIG. 12, the IoT network system 1000 may include a plurality of IoT devices, an access point 1200, a gateway 1250, a wireless network 1300, and a server 1400. IoT may refer to a network between objects using wired/wireless communication.

The plurality of IoT devices may form groups according to each characteristic of the IoT devices. For example, the plurality of IoT devices may be grouped as a home gadget group 1100, a home appliance group 1120, an entertainment group 1140, and a vehicle 1160. The home gadget group 1100, the home appliances group 1120, and the entertainment group 1140 may be connected to the communication network or other IoT devices through the access point 1200. The access point 1200 may be imbedded into an IoT device. The gateway 1250 may change a protocol to connect the access point 1200 with an external wireless network. The home gadget group 1100, the home appliances group 1120, and the entertainment group 1140 may be connected to an external communication network through the gateway 1250. The wireless network 1300 may include the Internet and/or a public network. The plurality of IoT devices may be connected to a server 1400 providing a predetermined service through the wireless network 1300, and a user may use the service through at least one of the plurality of IoT devices.

According to embodiments of the inventive concept, each of the plurality of IoT devices may include a baseband processor, and each baseband processor may select a feedback mode according to channel quality between the plurality of IoT devices and the access point 1200 or the wireless network 1300 and minimize an amount of computations based on the selected feedback mode to generate a precoding matrix indicator PMI. Furthermore, a baseband processor may determine a recommended MCS based on information on the selected feedback mode and channel quality, thereby generating a channel quality indicator CQI. Each baseband processor may transmit channel state information including the precoding matrix indicator PMI and the channel quality indicator CQI to the access point 1200 or the wireless network 1300, and a base station connected to the access point 1200 or the wireless network 1300 may perform an operation related to wireless communication such as beamforming based on the channel state information.

While the inventive concept has been discussed with reference to example embodiments, it will be apparent to those skilled in the art that various changes and modifications may be made without departing from the spirits and scopes of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of operating a wireless communication device for adaptive beamforming of a base station according to a state of a channel, the method comprising:
   receiving a sounding packet from the base station through the channel;
   obtaining channel quality information about the channel using the sounding packet;
   selecting a feedback mode out of a plurality of feedback modes based on the channel quality information;
   generating a matrix as a basis of the adaptive beamforming, based on the selected feedback mode; and
   transmitting channel state information including information on the matrix to the base station,
   wherein the selecting of a feedback mode comprises:
   predicting performance of the wireless communication device corresponding to each of the feedback modes under condition of the channel quality information;
   comparing the predicted performances of the wireless communication device with each other to provide a comparison result; and
   selecting the feedback mode for generating the matrix based on the comparison result.

2. The method of claim 1, wherein the channel quality information is one of a signal strength of the sounding packet, a signal-to-noise ratio (SNR) for the channel, and a signal to interference plus noise ratio (SINR) for the channel.

3. The method of claim 1, wherein the performance of the wireless communication device is about a data rate of the wireless communication device.

4. The method of claim 1, wherein predicting the performance of the wireless communication device comprises reading performance of the wireless communication device corresponding to each of the feedback modes from first modeling information stored in a memory of the wireless communication device under the condition of the channel quality.

5. The method of claim 1, wherein generating of the matrix comprises generating a beamforming matrix from a channel matrix by performing singular value decomposition of the channel matrix corresponding to the channel when the selected feedback mode is a singular value decomposition mode.

6. The method of claim 1, wherein generating of the matrix comprises, when the selected feedback mode is a geometric mean decomposition mode:
   generating from a channel matrix a diagonal matrix that includes singular values and a beamforming matrix by performing a singular value decomposition of the channel matrix corresponding to the channel;
   generating a rotation matrix based on the singular values; and
   generating a beamforming steering matrix by a multiplication computation of the rotation matrix and the beamforming matrix.

7. The method of claim 6, wherein generating of the rotation matrix comprises
   calculating a ratio of the singular values;
   reading trigonometric values corresponding to the ratio from a lookup table by referring to the lookup table stored in a memory of the wireless communication device; and
   generating the rotation matrix by using the trigonometric values.

8. The method of claim 1, further comprising determining recommended modulation and coding schemes (MCS) out of a plurality of MCSs based on the channel quality information and information on the selected feedback mode,
   wherein the channel state information further includes information on the determined recommended MCS.

9. The method of claim 8, wherein determining of the recommended MCS comprises, from information corresponding to the information on the selected feedback mode out of second modeling information stored in a memory of the wireless communication device, reading performances of the wireless communication device respectively corresponding to the plurality of MCSs under a condition of the channel quality; and
   comparing the read performances of the wireless communication device with each other to provide a comparison result and determining the recommended MCS based on the comparison result.

10. A method of operating a wireless communication device for adaptive beamforming of a base station according to a state of a channel, the method comprising:
 generating a diagonal matrix that comprises singular values and a beamforming matrix from a channel matrix by performing singular value decomposition of the channel matrix corresponding to the channel;
 reading trigonometric values corresponding to a ratio of the singular values from a lookup table stored in a memory of the wireless communication device;
 generating a beamforming steering matrix by a multiplication computation of a rotation matrix generated by using the read trigonometric values and the beamforming matrix; and
 transmitting channel state information comprising information on the beamforming steering matrix to the base station.

11. The method of claim 10, further comprising:
 receiving a sounding packet from the base station; and
 generating the channel matrix by estimating the channel by using a reference signal comprised in the sounding packet.

12. The method of claim 10, wherein the lookup table includes information on trigonometric values and reference ratios corresponding to each reference angle having a constant interval within a range of an angle corresponding to a range of the ratio of the singular values.

13. The method of claim 12, wherein the constant interval of the reference angles varies depending on a communication environment between the base station and the wireless communication device.

14. The method of claim 10, wherein the reading of the trigonometric values comprises:
 comparing the ratio of singular values with reference ratios of the lookup table;
 detecting a reference ratio equal to or closest to the ratio of singular value; and
 reading trigonometric values corresponding to the detected reference ratio from the lookup table.

15. The method of claim 10, further comprising updating the lookup table based on a communication environment between the base station and the wireless communication device.

16. A method of beamforming in a wireless communication system comprising a base station and a wireless communication device, the method comprising:
 receiving, by the wireless communication device, a sounding packet from the base station through a channel;
 transmitting, by the wireless communication device, information on a matrix generated based on a feedback mode selected according to channel quality of the channel to the base station; and
 receiving, by the wireless communication device, a data signal processed based on the beamforming according to the information on the matrix from the base station through the channel,
 wherein selecting a feedback mode comprises:
 predicting performances of the wireless communication device respectively corresponding to a plurality of feedback modes under a condition of the channel quality;
 comparing the predicted performances of the wireless communication device with each other to provide a comparison result; and
 selecting one of the plurality of feedback modes based on the comparison result.

17. The method of claim 16, wherein generating the matrix comprises:
 when the selected feedback mode is a geometric mean decomposition (GMD) mode, performing singular value decomposition of a channel matrix corresponding to the channel;
 generating a diagonal matrix that includes singular values and a beamforming matrix from the channel matrix;
 generating a rotation matrix based on the singular values; and
 performing a multiplication computation of the rotation matrix and the beamforming matrix.

18. The method of claim 17, wherein generating the rotation matrix comprises;
 using trigonometric values corresponding to a ratio of singular values; and
 reading from a lookup table stored in a memory of the wireless communication device.

* * * * *